(12) United States Patent
Grimes et al.

(10) Patent No.: US 6,964,045 B1
(45) Date of Patent: Nov. 8, 2005

(54) MULTIPLE PROGRAM STORAGE WITHIN A PROGRAMMABLE LOGIC CONTROLLER SYSTEM

(76) Inventors: James E. Grimes, 2505 Frays Mill Rd., Ruckersville, VA (US) 22968; William Marion Huntley, Jr., 930 Quail Ridge Cir., Earlysville, VA (US) 22936

( * ) Notice: Subject to any disclaimer, the term of this patent is extended or adjusted under 35 U.S.C. 154(b) by 0 days.

(21) Appl. No.: 09/465,147

(22) Filed: Dec. 16, 1999

(51) Int. Cl.[7] .................................................. G06F 9/06
(52) U.S. Cl. .......................... 717/320; 717/319; 710/10; 709/222; 709/228
(58) Field of Search ............................... 365/221; 700/2, 700/3; 710/1, 16, 10, 18, 14, 19; 712/31; 709/208, 209, 212, 213, 218, 220, 222, 224, 228; 717/319, 320

(56) References Cited

U.S. PATENT DOCUMENTS

| | | | | |
|---|---|---|---|---|
| 5,056,001 A | * | 10/1991 | Sexton | 710/10 |
| 5,072,374 A | * | 12/1991 | Sexton et al. | 700/2 |
| 5,473,757 A | * | 12/1995 | Sexton | 700/2 |
| 5,659,705 A | * | 8/1997 | McNutt et al. | 365/221 |
| 5,812,782 A | | 9/1998 | Jackson | |
| 5,815,426 A | | 9/1998 | Jigour et al. | |
| 5,854,638 A | | 12/1998 | Tung | |
| 5,960,450 A | | 9/1999 | Lang et al. | |
| 5,978,593 A | * | 11/1999 | Sexton | 710/1 |
| 6,202,120 B1 | | 3/2001 | Lang et al. | |
| 6,223,266 B1 | | 4/2001 | Sartore | |

* cited by examiner

Primary Examiner—B. James Peikari
(74) Attorney, Agent, or Firm—Eugene K. Hyun, Esq.; Armstrong Teasale LLP

(57) ABSTRACT

Methods and apparatus for a memory device host that stores and retrieves program and data information for multiple CPU-based modules in a programmable logic controller system are described. In one embodiment, the memory host module is configured to store multiple programs and corresponding data within the memory of the memory host module and further configured to retrieve programs and data from the memory of the memory host module for storage in other CPU-based modules.

27 Claims, 1 Drawing Sheet

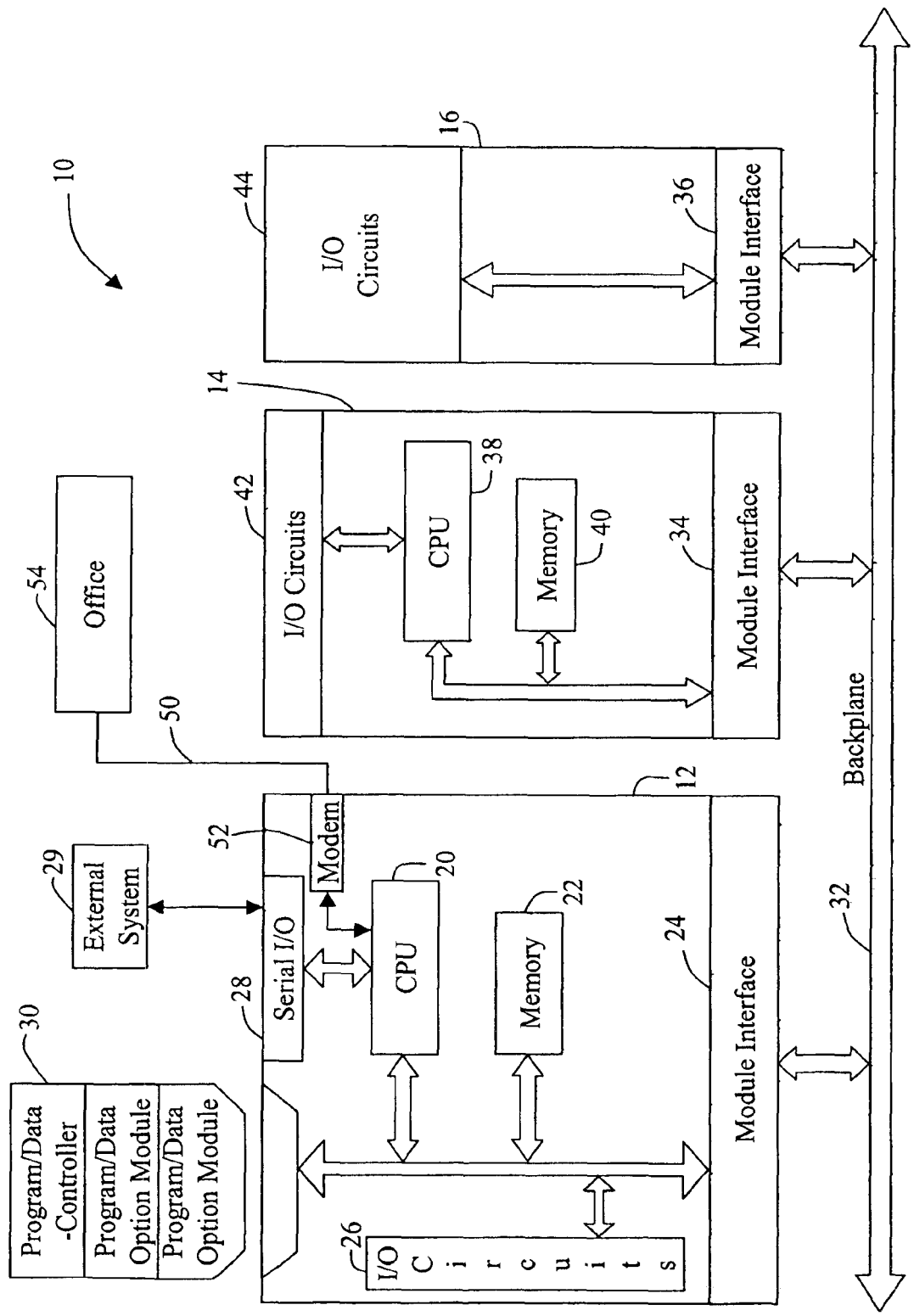

MULTIPLE PROGRAM STORAGE WITHIN A PROGRAMMABLE LOGIC CONTROLLER SYSTEM

BACKGROUND OF THE INVENTION

This invention relates generally to programmable logic controller (PLC) systems and, more particularly, to storage of multiple operating programs and data within a PLC system.

Known PLC systems are extensively used in process control applications. As a part of process control, the PLC system monitors input signals from a variety of inputs that report events and conditions occurring in a controlled process. For example, a PLC system can monitor such input conditions as motor speed, temperature, pressure, volumetric flow, as well as other conditions. A user program and pertinent data are stored in a memory within the PLC system to instruct the PLC system regarding what actions to take upon encountering particular input signals or conditions. In response to the input signals, the PLC system derives and generates output signals that are transmitted to various output devices to control the process. For example, based on the input signals, the PLC system issues output signals to speed up or slow down a motor, open or close a relay, raise or lower temperature or adjust pressure as well as many possible control functions.

A typical PLC system includes at least one option module that performs input/output (I/O) functions. Each option module typically has a plurality of input/output points. Any number of individual option modules may be employed within a PLC system and the control tasks distributed among them. The option modules are coupled through an interface bus, for example via a backplane, to a main controller having a microprocessor executing a user program. The main controller may also be in modular form. Option modules may also include a microprocessor and a memory containing separate user programs and data directed to a particular operation of the PLC system. These separate user programs are conventionally fixed at time of manufacture or are modifiable by the user through some local input device of the module. When an option module has separate user programs and data, information is exchanged between the main controller and the option modules of the PLC system. More specifically, commands and data are exchanged between the option modules and main controller utilizing a backplane or inter-connecting cabling to allow the system to operate in a coordinated fashion. However, as a result of the unique user programs and data in the individual option modules and main controller, configuration of the PLC system requires knowledge of multiple development software programs and the need to store information into the main controller and each option module independently. In addition, in the event of an option module failure, troubleshooting of the PLC system is complicated by independent operation of each microprocessor. In order to isolate the failure, the development software programs, typically residing on a separate computer, must be utilized, resulting in expensive downtime for the entire PLC system.

BRIEF SUMMARY OF THE INVENTION

It is therefore seen to be desirable to provide apparatus and methods for storing and retrieving option module programs and data in a programmable logic controller (PLC) system. The system including at least one option module and a memory host module each including a CPU and memory and interconnected by a backplane. The method consisting of storing in the memory of the memory host module an operating program and data for the option module and retrieving the operating program and data from the memory of the memory host module.

BRIEF DESCRIPTION OF THE DRAWINGS

The FIGURE is a block diagram of a PLC system, including a memory host module.

DETAILED DESCRIPTION OF THE INVENTION

FIG. 1 is a block diagram of a programmable logic controller (PLC) system 10 including a memory host module 12, and a plurality of option modules 14 and 16. Memory host module 12 includes a central processing unit (CPU) 20, memory 22, a module interface 24, and input/output (I/O) circuits 26. In alternative embodiments, memory host module 12 may also include a serial option interface 28 and/or a removable non-volatile memory device 30 such as flash memory. Memory 22 can be a random access memory (RAM), a read only memory (ROM), or both. Memory host module 12 connects to and communicates with option modules 14 and 16 in PLC system 10 via a backplane 32 which is a means for connecting electrical signals of memory host module 12 and various option modules 14 and 16. Option modules 14 and 16 are coupled to backplane 32 by module interface 34 and 36 respectively. Although two option modules 14 and 16 are shown in FIG. 1, PLC system 10 may include more or fewer option modules. Examples of option modules 14 and 16 include an option module for interfacing to a motor (not shown) or an option module for receiving various input signals from devices, such as a switch (not shown). Such interfaces are shown in option modules 14 and 16 as I/O circuits 42 and 44 respectively. It is also possible that memory host module 12 is the only module in PLC system 10.

Option module 14, includes a CPU 38 and a memory 40. Memory 40 can be a random access memory (RAM), a read only memory (ROM), or both. Memory host module 12 is configured to store and retrieve application programs and data for all option modules 14 in order to update the application programs and data for option modules 14.

In one embodiment, memory 22 is a ROM. Application programs and data for option module 14 are routed from memory 22 in memory host module 12 to option module 14 via module interface 24, over backplane 32, to module interface 34, and into option module memory 40 to be programmed. If memory 40 of option module 14 is ROM, the transfer of application programs and data from memory host module 12 is retained by option module 14. If memory 40 in option module 14 is RAM the application programs and data are not retained by option module 14 and have to be transferred from memory host module 12 to option module 14 each time system 10 is turned on (i.e. each time system 10 has power applied).

In an alternative embodiment, memory 22 in memory host module 12 can be a removable memory 30, such as (such as a memory card, CD-ROM, ZIP™ disk (ZIP is a trademark of Iomega Corporation), disk, tape, floppy disk, removable hard drive or the like). Alternatively, an easily programmable in circuit memory device such as a flash memory (not shown) or a compact flash card can be used. The application programs and data for modules 12 and 14 can be stored in removable memory 30 using an external system (not shown) located, for example, in the programming department of the PLC system user. When removable memory 30 is installed in memory host module 12, the program and data transfer can be the same as described above. Quick updating of the system is allowed by simply inserting a card or disk which could be periodically provided by mail or electronic mail.

In yet another embodiment, the application programs and data are not stored within memory host module 12. Instead, memory host module 12 has an external interface 28 to an external system 29. Application programs and data are routed from external system 29, to external interface 28, through memory host module 12 to module interface 24, over backplane 32, to module interface 34 and memory 40 of option module 14. A different interface to an external system, for example, would allow updating via the Internet 50, to a modem 52 connected to backplane 32 so that an entity could nearly instantaneously update all such PLC systems by making a single update at a central location such as main office 54.

Interfaces other than backplane 32 can be the interface that carries operating programs and data from memory host module 12 to option modules 14. Option module 14 and memory host module 12 can be configured with an external interface (not shown) and application program and data transfer could be accomplished using an external cable (not shown). In such an embodiment, backplane 32 would be used solely as a power source for option module 14 during application program and data transfer.

In one embodiment, option module 14 may have stored within its memory 40, the desired operating program and data. CPU 20 of memory host module 12 is configured to retrieve the operating program and data from option module 14 and store that operating program and data within its memory 22 or its removable memory device 30. Alternatively, CPU 20 of memory host 12 can pass the application program and data through to an external device (not shown) via external interface 28 or modem 52.

By using the system described above, simple, exact means for storage and retrieval of multiple application programs and data for a plurality of system modules is provided. Using the methods and apparatus described above, PLC systems can be duplicated without requiring knowledge of or use of multiple external systems used originally to generate the application programs and data. Therefore, all modules that may be contained within a system are not required to have an external interface, which in turn reduces costs of a PLC system 10.

While the invention has been described in terms of various specific embodiments, those skilled in the art will recognize that the invention can be practiced with modification within the spirit scope of the claims.

What is claimed is:

1. A method for storage and retrieval of programs and data within a PLC system, the PLC system including a plurality of modules including a memory host module including a CPU and memory, at least one option module including a CPU and memory, the at least one option module including a first option module and a second option module, the first module including a memory, a backplane interconnecting the memory host module and the at least one option module, the memory host module coupled to an external device, said method comprising the steps of:

storing a plurality of operating programs and data including a first and a second operating program and data in the external device coupled to the memory host module, wherein the first operating program and data corresponds to the first option module and the second operating program and data corresponds to the second option module;

retrieving the first operating program and data;
   retaining the second operating program and data; and
   transmitting the first operating program and data to the first option module.

2. A method according to claim 1 further comprising the step of transferring the first operating program and data for the first option module from the memory of the memory host module to the memory of the first option module via the backplane.

3. A method according to claim 1 further comprising the step of transferring the first operating program and data for the first option module from the memory of the first option module to the memory host module via the backplane.

4. A method according to claim 1 wherein the memory host module is further configured with an external device interface, said method further comprising the step of transferring the first operating program and data for the first option module from the external device through the memory host module, to the memory of the first option module via the backplane.

5. A method according to claim 1 wherein the memory host module is further configured with an external device interface, said method further comprising the step of transferring the first operating program and data for the first option module from the external device to the memory of the memory host module via the external device interface.

6. A method according to claim 1 wherein the memory host module further configured with an interface to the external device, said method further comprising the step of transferring the first operating program and data for the first option module from the first option module through the memory host module via the backplane, to the external device.

7. A method according to claim 1 wherein the memory host module further configured with an external device interface, said method further comprising the step of transferring the first operating program and data for the first option module from the memory of the memory host module to the external device via the external device interface.

8. A method according to claim 1 wherein the memory host module further configured with an external device interface, the first option module further configured with an external device interface, said method further comprising the step of transferring the first operating program and data for the first option module from the memory of the memory host module to the memory of the first option module via the external device interfaces.

9. A method according to claim 1, wherein the memory host module further configured with an external device interface, the first option module further configured with an external device interface, said method further comprising the step of transferring the first operating program and data for the first option module from the memory of the first option module to the memory of the memory host module via the external device interfaces.

10. A method according to claim 1 further comprising controlling said PLC system and other PLC systems via said external device.

11. A method in accordance with claim 1 further comprising coupling said memory host module to at least two of the at least one option module.

12. A memory host for a programmable logic controller (PLC) system, the system comprising at least one option module further comprising an option module memory, said at least one option module including a first option module and a second option module, said first option module including a memory, said memory host comprising a memory, a central processing unit (CPU), and a backplane interface, said memory host coupled to an external device and configured to:

retrieve a first operating program and data, wherein the first operating program and data corresponds to said first module;

retain a second operating program and data, wherein the second operating program and data corresponds to said second module; and transmit the first operating program and data to the first option module, wherein said external device is configured to store a plurality of operating programs and data including the first operating program and data and the second operating program and data.

13. A memory host in accordance with claim 12 further configured to selectively transfer the first operating program and data from said memory host to said memory of said first option module via said backplane interface.

14. A memory host in accordance with claim 12 further configured to automatically transfer the first operating program and data from said memory host to said memory of said first option module via said backplane interface.

15. A memory host in accordance with claim 12 further configured with means to transfer the first operating program and data from said memory host to said memory of said first option module via said backplane interface.

16. A memory host in accordance with claim 12 further configured to retrieve the first operating program and data from said memory of said first option module via said backplane interface for storage.

17. A memory host in accordance with claim 12 further configured with means to retrieve the first operating program and data from the memory of said first option module via said backplane interface for storage.

18. A memory host in accordance with claim 12 further comprising an external device interface adapted to be connected to said external device, and further configured to transfer the first operating program and data from the external device to said memory host via said external device interface.

19. A memory host in accordance with claim 18 wherein said external device interface is a serial interface.

20. A memory host in accordance with claim 18 further configured to transfer the first operating program and data from the external device via the external device interface to the memory of said first option module via said backplane interface.

21. A memory host in accordance with claim 18 further configured to transfer the first operating program and data from the memory of said first option module via said backplane interface to the external device via the external device interface.

22. A memory host in accordance with claim 18 further configured to transfer the first operating program and data from said memory host to the external device via the external device interface.

23. A memory host in accordance with claim 18 further configured to transfer the second operating program and data from the memory host via the external device interface to said second option module.

24. A memory host in accordance with claim 18 further configured to transfer the second operating program and data from said second option module that further comprises an external device interface to said memory of said memory host via the external device interfaces.

25. A memory host in accordance with claim 12 wherein said memory of the memory host comprises flash memory.

26. A memory host in accordance with claim 12 wherein said external device is coupled to said memory host via Internet.

27. A memory host in accordance with claim 12 wherein said memory host is coupled to at least two of the at least one option module.

* * * * *